United States Patent [19]

Ely

[11] Patent Number: 4,964,069

[45] Date of Patent: Oct. 16, 1990

[54] SELF ADJUSTING VIDEO INTERFACE

[75] Inventor: Joseph C. Ely, Kingston, N.Y.

[73] Assignee: International Business Machines Corporation, Armonk, N.Y.

[21] Appl. No.: 334,787

[22] Filed: Apr. 6, 1989

Related U.S. Application Data

[63] Continuation of Ser. No. 48,870, May 12, 1987, abandoned.

[51] Int. Cl.⁵ .......................... G09G 1/00; H04N 5/04
[52] U.S. Cl. ..................................... 364/521; 364/518; 358/148; 358/149; 358/51; 340/814; 340/720
[58] Field of Search ...................... 364/518, 519, 521; 340/720, 814, 723, 724, 732, 733; 358/148, 149, 51

[56] References Cited

U.S. PATENT DOCUMENTS

| | | | |
|---|---|---|---|
| 3,600,556 | 8/1971 | Acker | 235/61.11 E |
| 4,163,212 | 7/1979 | Buerger et al. | 340/146.3 H |
| 4,236,105 | 11/1980 | Wilkinson | 318/577 |
| 4,411,007 | 10/1983 | Rodman et al. | 375/107 |
| 4,415,984 | 11/1983 | Gryger et al. | 364/900 |
| 4,441,206 | 4/1984 | Kuniyoshi et al. | 382/8 |
| 4,580,242 | 4/1986 | Suzuki et al. | 364/900 |
| 4,626,837 | 12/1986 | Priestly | 340/723 |
| 4,638,360 | 1/1987 | Christopher et al. | 358/148 |
| 4,656,602 | 4/1987 | Berkland et al. | 364/900 |
| 4,670,785 | 6/1987 | Medin | 358/149 |
| 4,713,691 | 12/1987 | Tanaka et al. | 358/148 |
| 4,754,334 | 6/1988 | Kriz et al. | 358/244 |

Primary Examiner—Gary V. Harkcom
Assistant Examiner—Raymond J. Bayerl
Attorney, Agent, or Firm—Mark S. Walker; Joseph J. Connerton

[57] ABSTRACT

A system is provided for synchronization between a host processor and a video interface having display terminal(s) and/or digital printer(s). The video interface is made self-adjusting with the reference synchronization signal of the video terminal which are provided by the host processor. A pixel clock in the video interface is recalibrated to a higher clocking rate and used for sampling the incoming data signals to identify the precise center of the data signals. The timing relationship betweeen the video interface clock signals and the host sync signals is then determined and stored, the resulting synchronization permitting the video data signals to be sampled in their precise center and thereby enhance the operation of the digital printer without manual intervention of service personnel.

6 Claims, 4 Drawing Sheets

SELF ADJUSTING VIDEO INTERFACE

This is a continuation of application Ser. No. 07/048,870, filed May 12, 1987, now abandoned.

FIELD OF THE INVENTION

The present invention relates to adjustment of a video interface and more particularly to the automatic self adjustment of a video-interface during installation or relocation of the interface without physical intervention of service or operating personnel.

DESCRIPTION OF THE PRIOR ART

In video display systems adapted to work with or controlled by host processors, video interface timing differences exist from host to host and are subject to variation when a host is upgraded or modified by an Engineering Change Level. Adjustment of the delay from the reference timing of the host to the start of data applied to the display is required to allow accurate reception of the data. Variation in the above described timing parameter results in an off center display on the screen of the cathode ray tube display. While this can be compensated for by adjustment of the cathode ray tube, where a digital printer is used in the video loop, the precise location of the printed pixels with respect to the reference timing of the host must be provided for an acceptable printed document.

It has been customary in the prior art to utilize service representatives to provide analog adjustment of the timing relationship between the host and the video interface. Similarly, service representatives were required whenever the host system or the video interface was relocated or modified. While manual adjustment provided an acceptable level of data fidelity between the host and video interface, the cost of such manual intervention is very high. It was thus desirable to provide an automatic adjustment of a video interface receiver to synchronize the timing relationship between the host and the video interface and thereby enhance the output of the terminal device.

DESCRIPTION OF THE INVENTION

The present invention is directed to a self adjusting video interface (SAVI) for synchronizing a video terminal device with a host processor. A single dot wide vertical line is generated in the middle of the screen of the video display terminal and the horizontal sync pulse is used as a reference for the system clock associated with the host. The SAVI, which forms a part of a graphics display processor has an associated clock for clocking the pixel data. The host generates 1024×1024 pixels at a 50–60 Hz rate, the center pixel being pixel 512. When a horizontal sync pulse corresponding to the 512th vertical line is generated, the sync pulse corresponds to ¼ the data rate of the SAVI clock. The horizontal sync pulse has a clock tolerance of ±16 pixels. Each SAVI clock signal, in turn, is converted into 16 sample clock signals, and the sync pulse is sequentially sampled by the sample clock signal. When the sample signals detected by a comparator circuit exceed a predetermined threshold, the center position of the sync pulse is identified. The sync pulse is then delayed by the incremental variation between the terminal edge of the sync pulse from the detected center. Operation of the above described system is automatic and is initiated when power is applied to the system.

Accordingly, a primary object of the present invention is to provide a self adjusting video interface.

Another object of the present invention is to provide a self adjusting video interface in which the clocks of a host and video terminal are automatically synchronized to calibrate the position of individual pixels on a display medium.

The foregoing and other objects, features and advantages of the invention will be apparent from the more particular description of the preferred embodiments of the invention, as illustrated in the accompanying drawings.

DESCRIPTION OF THE PREFERRED EMBODIMENT

Figure 1:
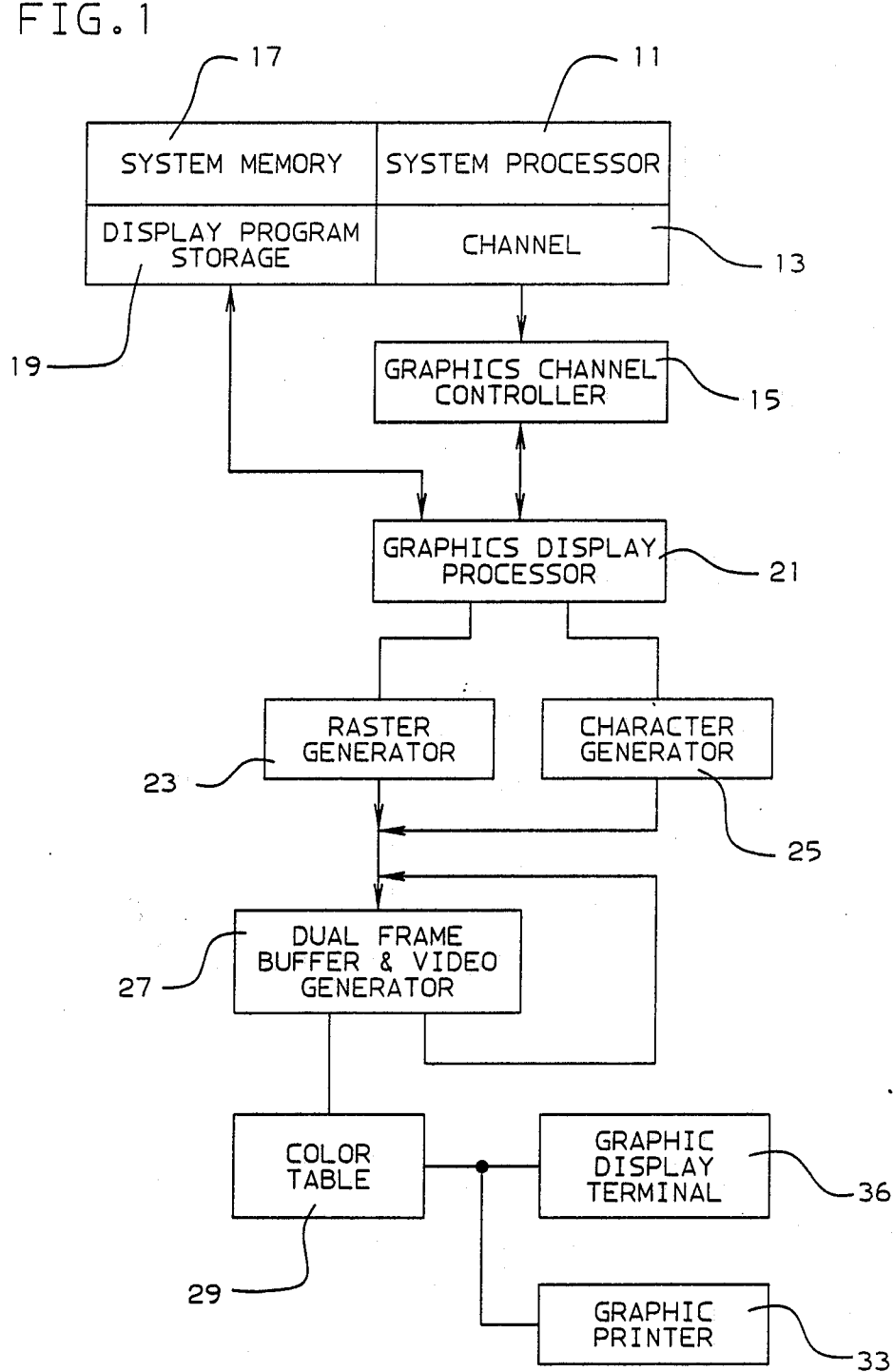
FIG. 1 is a block diagram schematic of a preferred environment of the instant invention.

Referring now to FIG. 1, there is illustrated in block schematic form the environment of the instant invention. A system processor or host 11 is connected through channel 13 to a graphic channel controller 15. The system processor may be a host system such as provided by various IBM S/370/43XX/30XX series systems. The system processor includes an associated system memory 17 which in turn includes a display program storage area 19 dedicated to the graphics display function. The graphics channel controller 15 is a communication controller providing a host interface for local and remote (teleprocessing) configurations, and may comprise, in practice, an IBM 5085 Graphics Channel Controller.

A graphics display processor 21 is a display processor which may contain transformation and clipping facilities, a serial interface processor and system memory. An example of such a processor is the IBM 5085 Graphics Processor. A raster generator 23 and character generator 25 are interconnected between the display processor 21 and a dual frame buffer and video generator 27. Dual frame buffer 27 is a representation in pixel memory of the display screen space. In the preferred embodiment of the invention, a 1024×1024 pixel display is contemplated, with a color index for each pixel provided by color table 29. Dual frame buffers 27 permit an instantaneous replacement of the display image without blinking or flashing. In a dual frame buffer operation, one buffer is used to continually refresh the image on the display screen of graphic display terminal 36, while display program updates the other frame buffer with the next image to be displayed. When the display program of graphic processor 21 has completed its image generation, the frame buffers are swapped and their roles exchanged. Alternatively, the output device may comprise a graphic printer 33, and it is recognized that a plurality of such devices may be included as output terminals.

Color table 29 maintains the active colors/gray scale shades for a given application and provides for a mapping of the frame buffer contents to colors or gray scale on the screen. The above environment is described by way of example and is not considered to form a part of the instant invention.

The instant invention will be described in terms of an all points addressable graphic cathode ray tube display, such as the IBM 5081 Display used in the IBM 5080 Graphic System. The IBM 5080 Graphics System includes a 5085 Graphics Processor, a special purpose processing unit that, in addition to providing interactive graphics capability for its host systems, provides functions and advanced graphics capability to allow significant off-loading of a host processor.

Both the processor or controller and the display device have their respective clocks or timers, which are not initially synchronized. The pixel clock, which originates in the host (processor or controller) generates the horizontal sync pulse and the data or blank pulses for each pixel. The display contemplated in the preferred embodiment has a 1024×1024 pixel capability, the horizontal center pixel being pixel 512. In the initial adjustment mode, the horizontal sync pulse may have a +16 to −16 pixel tolerance, the +16 being those pixels to the right and −16 pixels to the left of the center line. As previously described, such a variation could be tolerated in a display terminal since it could be manually compensated for by adjustment. However, the use of a printer as the terminal device requires that all pixels be specified in the center of the pixel data time, and that the pixel be generated within 15% of the center line. Pixel time, in turn, is referenced to and measured from the leading edge of the horizontal sync pulse.

In a multicolor vector graphics display, separate signal trains are required for the green, red and blue components. Horizontal sync signals are generated by the host/controller at the conventional 50–60 Hz rate utilized for cathode ray tubes.

The positive excursion of the sync waveforms produces the blank signal, while a short duration signal applied to the center of the positive excursion generates an on full or unblank short duration signal. The composite of the three color signals produces a white signal. An idealized placement of the unblank signal at the precise center of the sync signals is assumed. How this is accomplished by means of the present invention will be more fully described hereinafter.

Figure 2:
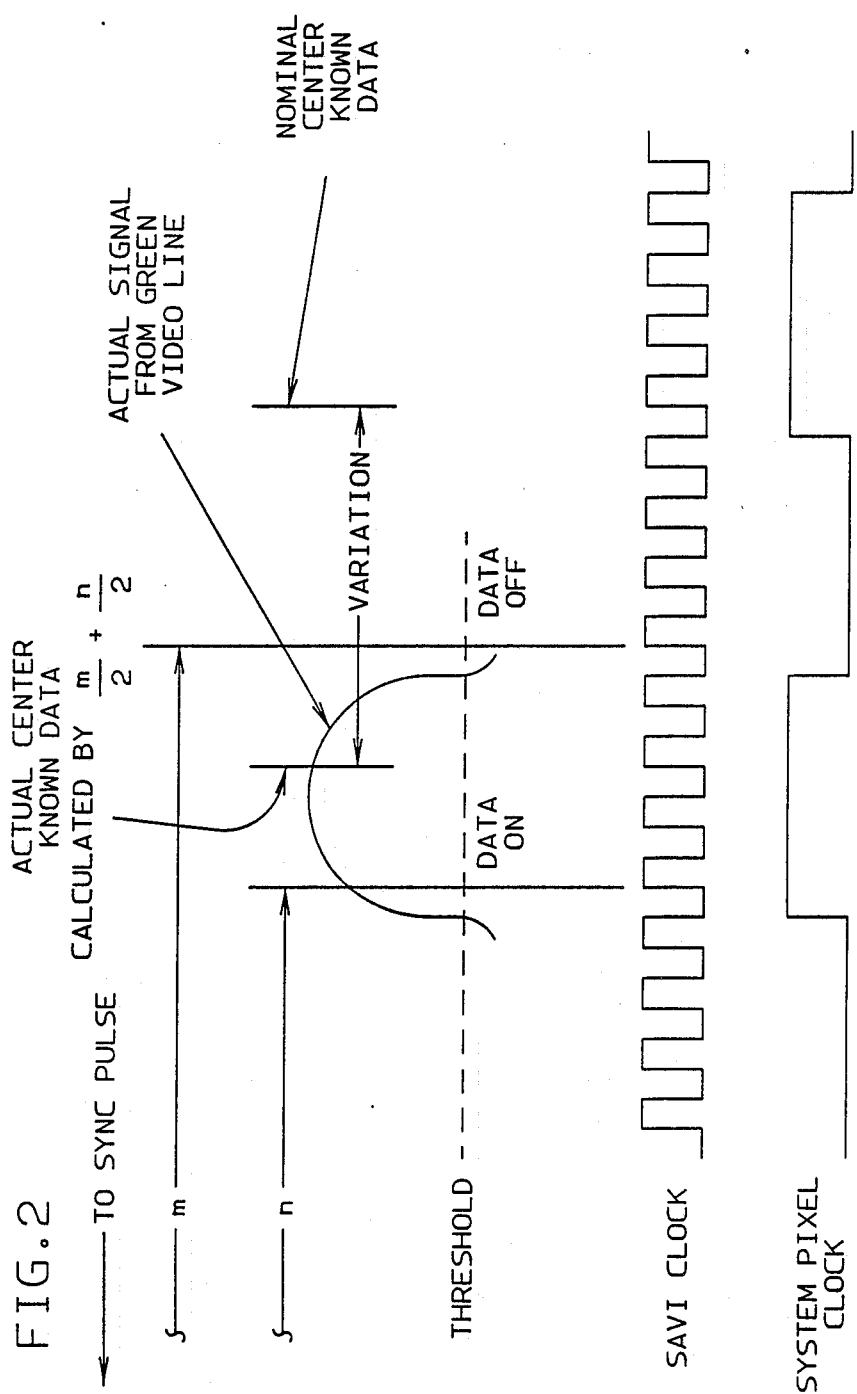
FIG. 2 is a timing diagram of the host and SAVI clock and related timing components.
Figure 3:
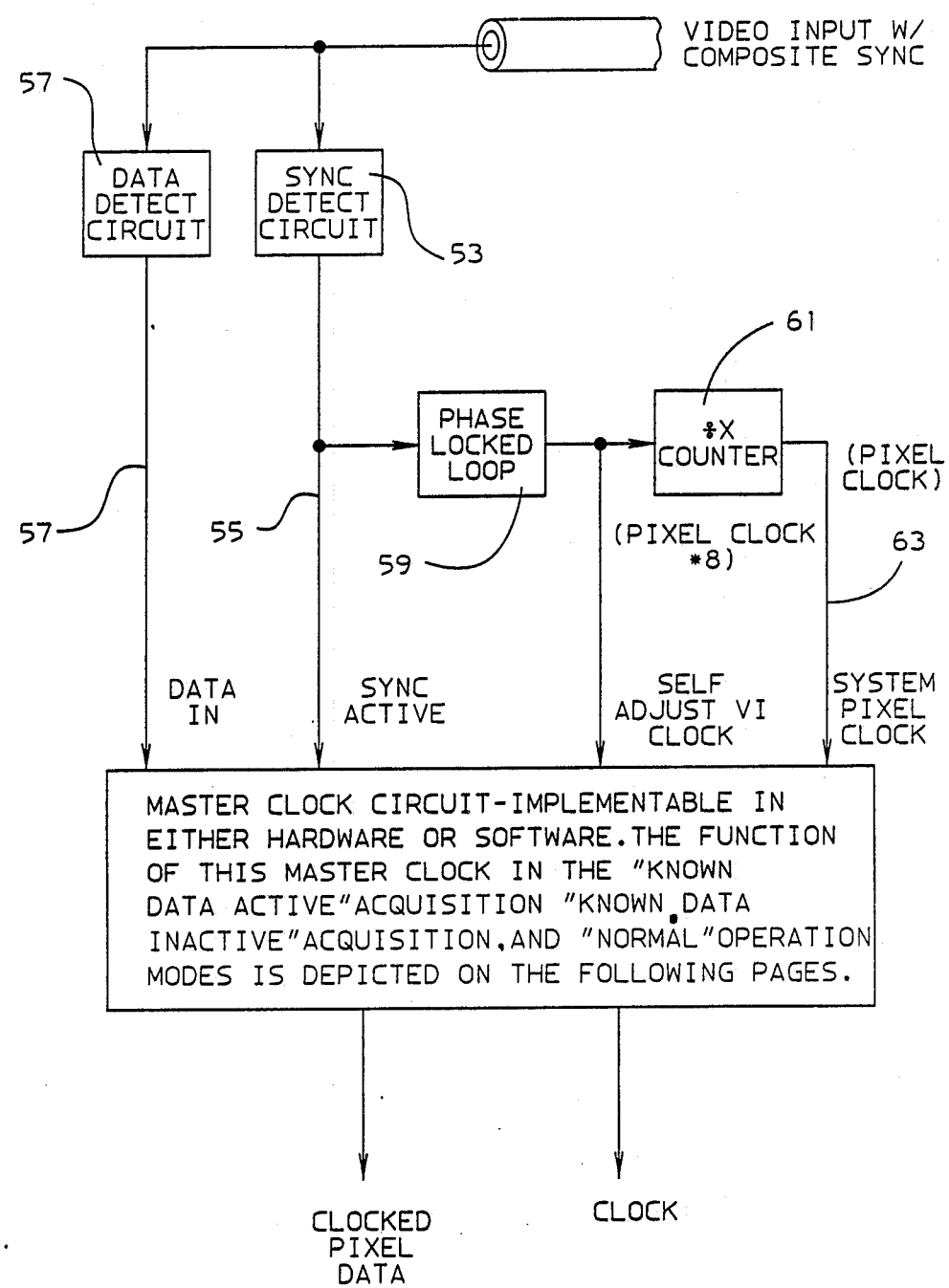
FIG. 3 is a block diagram of a configuration and timing aspects of the instant invention.
Figure 4:
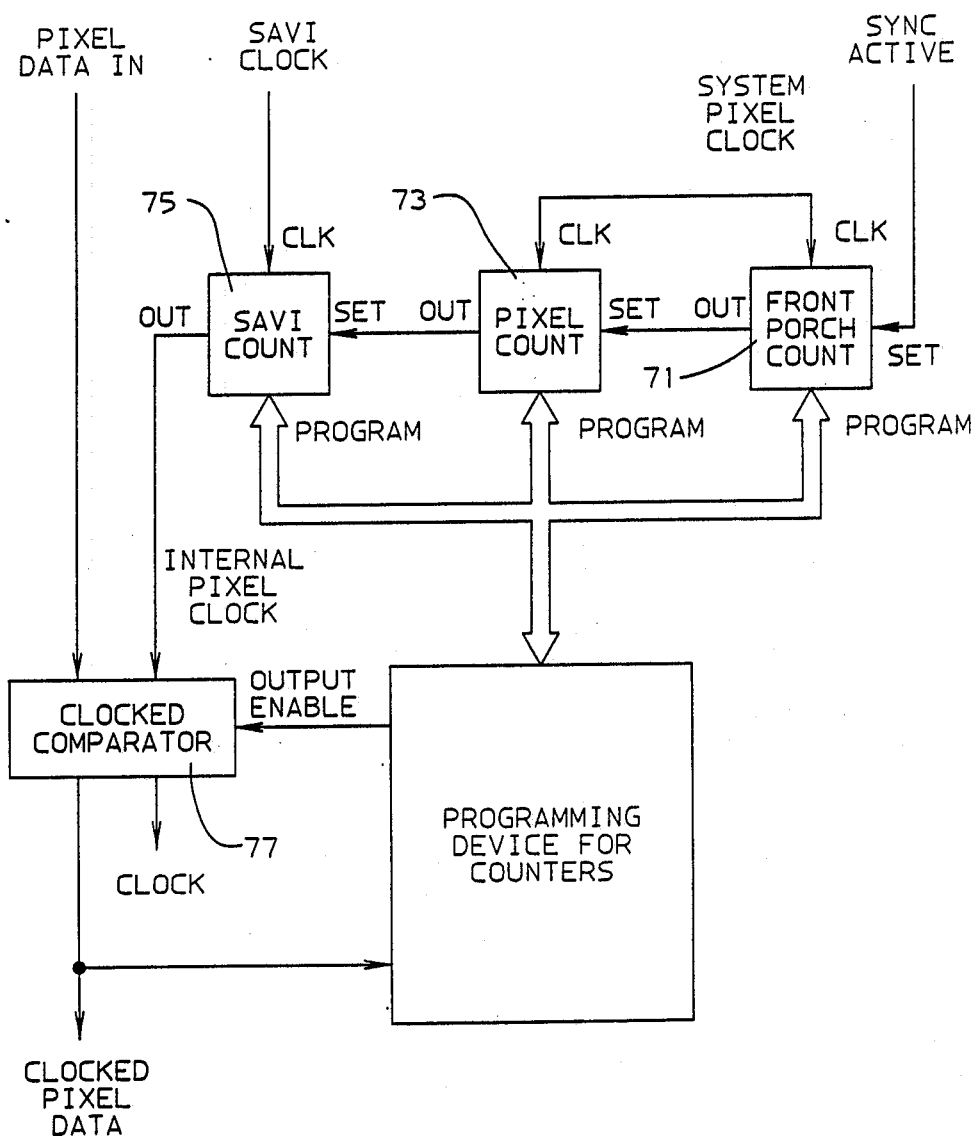
FIG. 4 is a block diagram of the configuration mode for determining known data active, known data inactive and the location of the center of known data.

The instant invention may be implemented in hardware or software, with the specific implementations being shown in FIGS. 3 and 4 respectively. However, the specific problem may be more understood by reference to the timing diagram of FIG. 2. As previously described, the host system provides the system pixel clock pulses along with the sync pulses and pixel data. While the pixel data can be synchronized with the horizontal sync signal, they must also be synchronized with the pixel clock which resides in the graphic display processor 21.

Referring now to FIG. 2, the system pixel clock is shown as the bottom signal in the timing diagram. Since the center of the pixel signal must be determined within ±15% of the pixel time, the SAVI clock is set to 8× the frequency of the system pixel clock. Thus eight positive or negative excursions of the SAVI clock occur during each system pixel clock signal. The signal for the SAVI clock is shown in the timing diagram immediately above the pixel clock signals. Thus, each signal of the SAVI is equal to 0.125 pixels of the system pixel clock. A pattern comprising a signal one dot wide vertical line at pixel 512 is provided by the host as video data. The video data herein employed comprises 1024×1024 pixels at 50 or 60 Hz non interlaced scan rate to allow configuration number 1 of the SAVI shown in FIG. 3 and described hereinafter to be operated. Referring now to FIG. 3, once the configuration of the SAVI is initiated by the operator, the SAVI samples the video input with composite sync data on the video interface using data detect circuit 51 and sync detect circuit 53 for the pattern with a reference mark, H sync active, on line 55. The pixel data from data detect circuit 51 is identified as "pixel data in" on line 57. Known data active acquisition comprises the leading edge of pixel 512, with a delay n as shown in FIG. 2. If this pattern is not detected, delay n is incremented in the phase locked loop circuit 59 by data on the video interface and again sampled. This increment/sample procedure continues until the pattern is detected, as shown in FIG. 2. When the pattern is detected, the value n is stored in non-volatile memory. The circuit for dividing the 8× pixel clock is reconverted to the normal clock frequency in circuit 61 whereby the output on line 63 represents the normal system pixel clock.

Once the reference timing to "known data active" is measured, the reference timing to "known data inactive", ie, the trailing edge of pixel 512, is measured. The SAVI samples the data on the video interface for that pattern with a reference timing to "known data inactive" delay of m where m is greater than n. If the pattern is detected, m is incremented by the value of y. The data on the video I/F is again sampled. This increment/sample procedure continues until the pattern is not detected. When this occurs, the value m is stored in a non-volatile memory. The exact location of known data active and know data inactive in regard to the reference timing allows precise location of actual center known data in regard to the reference timing by calculating $n/2+m/2$ (FIG. 2). The actual known data is then subtracted from nominal center known data stored in the SAVI at the time of manufacture to calculate the variation of a specific host delay from the specific nominal host delay. This variation is also stored in non-volatile memory and the configuration is complete. During operation the SAVI will automatically subtract the variation from each nominal data expected timing to provide precise locations of data on the video interface data stream for the specific host. The master clock circuit implementation may be implemented in hardware or software. The function of the master clock in the "known data active" and "known data inactive" acquisitions together with the "normal" operational modes is more fully shown in FIG. 4.

Referring now to FIG. 4, there is illustrated the configuration mode for determining "known data active", "known data inactive" and determining the center of the known data.

The truth table used to operate this configuration is described as a sequence of steps numbered in their operational sequence relative to each of the three determinations, ie, "known data active", "known data inactive" and determination of the actual center of known data.

1. To determine "Known Data Active"
   a. Set the front porch count 71 equal to the nominal front porch count minus the maximum video tolerance. The term "front porch count" is a term in the video art which defines the time from the end of the horizontal sync pulses to the data store signal.
   b. The front porch count 71 is equal to the nominal front porch value minus the maximum video tolerance set in pixel count 73 to known data active (pixel 512 in the case of the IBM 5080 Graphics System).
c. Reset the SAVI count 75 to 0.
d. Enable the output of the clocked comparator 77.
e. Check if the clock pixel data is active
  i. If not positive, proceed steps 1-f
  ii. If active, store the front porch count and the SAVI in non volatile memory and proceed to Step 2 of the configuration mode.
f. Is the SAVI count equal to X-1? (X=8 for IBM 5080)
  i. No—proceed to Step 1—g.
  ii. Yes—increment the front porch count reset the SAVI count to 0 and return to Step 1—e.
g. Increment the SAVI count return to Step 1—e
h. Error Check.

2. To determine "Known Data Inactive"
  a. Load the front porch count and the SAVI count from non-volatile memory.
  b. Set the pixel clock to "known data active" (pixel 512 in the case of the IBM 5080).
  c. Enable the output of the clocked comparator 77.
  d. Check if clocked pixel data is inactive?
    i. No—proceed to Step 2—e.
    ii. If inactive, store the front porch count and SAVI count in non-volatile memory (do not erase results of step 1) and proceed to step 3 of the configuration mode.
  e. Is the SAVI count equal to X−1?
    i. No—proceed to step 2—f.
    ii. Yes—increment front porch count and reset the SAVI count equal to 0. Return to Step 2—d.
  f. Increment SAVI count, return to step 2-d.
  g. Error Check.

3. Determine "Actual Center Known Data"
  a. Calculate n from 1-e-ii
    n=[(front porch count)+SAVI count]
  b. Calculate m from step 2-d-ii
    m=[(front porch count)+SAVI count]
  c. Add the values of steps 3-a and 3-b
  d. Divide the sum by 2×.
  e. Load the whole number into the front porch count 71.
  f. Multiply the remaining fraction by X and round off.
  g. Load the value 3-f into SAVI count 75.

After the data receivers are configured using steps 1, 2, and 3 above, the system is prepared to accurately receive video data.

4. Load Configuration Data
  a. Load front porch count 71 from non-volatile memory (calculated in step 3-e).
  b. Load SAVI count 75 from non-volatile memory (calculated in Step 3-g).
  c. Load pixel count 73 with the number of the pixel you wish to read.
  d. Enable the output of the clocked comparator 77.

The above described configurations and operations are only required at installation and relocation or reconfiguration times, are automatic and do not require the services of service personnel for the initial alignment. This provides a substantial saving to the user and permits frequent reconfiguration without the normal costs associated with such reconfiguration.

While the preferred embodiment of the instant invention is described in terms of a workstation printer configuration, the invention is equally applicable to digital television, video super position, interactive video and three-dimensional video, and the specific implementations in the modes described above in hardware or software are elementary to one skilled in the art.

While the invention has been particularly shown and described with reference to a preferred embodiment thereof, it will be understood by those skilled in the art that various changes in form and detail may be made therein without departing from the spirit and the scope of the invention.

What is claimed is:

1. A system for automatic adjustment of a video interface during installation of relocation of said interface, said adjustment being with respect to the reference timing of a system processor to which said video interface is connected, said system comprising:
   means in said system processor for generating reference timing signals,
   means in said system processor for generating a data signal to said video interface, said data signal being delayed a specified system processor delay from a reference timing signal generated by said means for generating,
   said video interface having a timing clock for timing the display of a plurality of pixels on a display device connected to said video interface, and
   said video interface further comprising means for synchronizing said interface timing clock with a reference signal from said means for generating reference timing signals,
   said synchronizing means comprising:
   means for determining a variation between the specified system processor delay and the unadjusted video interface delay from said reference signal to the center of said data signal as measured by said video interface, and
   means for adjusting said video interface delay by the amount of said variation to establish an adjusted video interface delay such that said plurality of pixels are correctly displayed on said display device.

2. A system of the type defined in claim 1 wherein said display device is a digital printer.

3. A system of the type defined in claim 1 wherein said reference timing signal from said system processor comprises the horizontal synchronizing signal of said display device.

4. A system of the type claimed in claim 3 wherein said display device has a multicolor vector graphics capability.

5. The system of claim 1 wherein said means for determining a variation comprises:
   first means for determining a first delay between said reference signal and a start of said data signal;
   second means for determining a second delay between said reference signal and an end of said data signal; and
   third means for determining said variation as midway between said first and second delays.

6. A method for adjusting a video interface between a system processor and a display device, wherein said system processor generates a reference signal and a data signal, said data signal representing displayable pixels at a system specified delay from said reference signal, and wherein said video interface has an unadjusted interface delay and said video interface generates an interface clock signal for each displayable pixel, said method comprising the steps of:
   generating a data signal at a specified display device location, said data signal having a leading and a trailing edge, with said leading edge delayed from said reference signal by said system specified delay;

subdividing said clock signal into clock intervals such that the smallest interval is within th necessary pixel variation tolerance;

setting a video interface adjustment to a minimum tolerance;

testing for a leading edge of said data signal at a position based on said system specified delay adjusted by said video interface adjustment;

if said leading edge is found, storing said video interface adjustment as a leading edge adjustment value, otherwise incrementing said adjustment by one clock interval and repeating the testing and incrementing steps until said leading edge is found;

testing for a trailing edge of said data signal, if found, storing said video interface adjustment as a trailing edge adjustment value, otherwise incrementing said adjustment by one clock interval and repeating the testing for trailing edge and incrementing steps until said trailing edge is found;

determining the video interface adjustment delay to a center point of said data signal by calculating the midpoint between said leading edge adjustment value and said trailing edge adjustment value; and storing said video interface adjustment delay for use by said video interface.

* * * * *